3,218,273
METHOD OF CURING EPOXY AND
POLYESTER RESINS
Lewis Montesano, Upper Montclair, N.J., assignor to Bell
Telephone Laboratories, Incorporated, New York,
N.Y., a corporation of New York
No Drawing. Filed Oct. 22, 1962, Ser. No. 232,259
9 Claims. (Cl. 260—2.5)

This invention relates to a process for curing epoxy and polyester resins. More particularly, the present invention is directed to a technique for curing epoxy and polyester resins with conventional curing agents in the presence of an accelerator comprising water and silica gel. Further, an embodiment of the present invention is directed to a novel epoxy foamed resin and to a process for the production thereof.

The epoxy resins are of recent origin and have been widely used in such applications as adhesives, laminates, castings, sealants and coatings. For example, they have been particularly useful as bonding agents and laminating agents in the lamination of glass cloth and in bonding metal to metal, metal to plastic, plastic to plastic, etc. The epoxy resins are initially obtained as viscous liquids, semisolids or solids, and subsequently are cured either at ambient temperatures or by heating in the presence of a suitable curing agent.

The epoxy resins generally comprise a polyether derivative of a polyhydric organic compound such as polyhydric alcohols and phenols containing at least two phenolic hydroxy groups, and are further characterized by the presence of at least two terminal, 1,2-epoxy groups per molecule of epoxy resin. A typical 1,2-epoxy resin may be prepared by the reaction of epichlorhydrin with bisphenol A [2,2, bis-(4-hydroxy-phenyl)-propane], generally in alkaline solution. The epoxy resins may also be prepared from other 1,2-epoxy compounds including, for example, polyglycidyl ethers of ethylene glycol, propylene glycol, trimethylene glycol, diethylene glycol, triethylene glycol, glycerol, dipropylene glycol, etc. Similarly, other dihydric phenols may be employed, including resorcinol, catechol, hydroquinone, 4,4', dihydroxybenzophenone, 1,1 - bis(4 - hydroxyphenyl) - ethane, 1,1 - bis - (4 - hydroxyphenyl)-butane, 2,2-bis-(4-hydroxyphenyl)-butane (bis-phenol B), 1,5-dihydroxynaphthalene, etc. The various epoxy resins formed from the reactants set forth above are not necessarily equivalent and, furthermore, the exact compositions of the epoxy resins are dependent upon the molecular proportions of the epoxy compound and dihydric phenol employed in its preparation. The epoxy resins so produced must then be cured or resinified in order to form the desired final product.

Heretofore, the complex epoxy resins have been cured to an insoluble, infusible condition by means of a wide variety of materials. Those curing agents which may be employed for such purposes are described by Lee and Neville, "Epoxy Resins," McGraw Hill Book Company, Inc., New York, New York, 1957. Examples of these curing agents are: organic amines such as ethylene diamine, diethylene triamine, dimethylaminopropylamine, 2,4-diamine-2-methylpentane, dimethylaminomethyl phenol, 2,4,6-tris-(dimethylaminomethyl) phenol, morpholine; acid anhydrides such as phthalic succinic and maleic anhydrides; polysulfide liquid polymers of the "Thiokol" type in combination with tertiary amines, aldehyde condensation resins such as urea-formaldehyde, melamine-formaldehyde and phenol-formaldehyde; amides such as acrylamide, urea, thiourea, toluene sulfonamide, tertiary butyl acrylamide, etc.

The polyamines and polyamides described above react with the complex epoxy resins causing the resin to cure to an infusible, insoluble state through the reaction of the amine or amide functional groups with the epoxy groups and to some extent through reaction between epoxy groups and hydroxy groups, catalyzed by the amines or amides. Generally, such techniques are effected at elevated temperatures which tend to increase the difficulty of processing the material.

The acid anhydrides possess certain undesirable properties which have placed a considerable limitation on their commercial utilization. It has been found, for example, that the acid anhydrides show little activity in the cure of polyepoxides at room temperature or at slightly elevated temperatures and are effective only at high temperatures, so preventing their use in the preparation of compounds that are to be cured at room temperatures or which may be adversely affected by high temperatures. Even at high temperatures, the anhydrides in many cases act slowly and are unable to be used in compositions which must be cured rapidly.

The polyesters are also of recent origin and have been widely utilized in the electrical industry as insulation, potting compounds, binding materials, etc. The polyesters, as in the case of the epoxy resins, are initially obtained as viscous liquids, semisolids or solids which must be dissolved prior to use, and subsequently are cured either at ambient temperatures or by heating in the presence of a suitable curing agent.

The polyesters generally comprise the polycondensation product of a dicarboxylic acid and a dihydroxy alcohol. These compounds may further be modified by monocarboxylic acids, monohydroxy alcohols and even small amounts of polycarboxylic acids and polyhydroxy alcohols. The major portion of polyesters now in production contain unsaturation which is generally introduced by use of the unsaturated dicarboxylic acids or by the use of unsaturated alcohols. These unsaturated polyesters are cross-linked by dissolving them in a monomeric copolymerizable compound, such as styrene, prior to curing.

The polyesters have been cured to an insoluble infusible condition by means of a variety of curing agents. Those which may be employed are described by Bjorksten Research Laboratories, Inc., "Polyesters and Their Applications," Reinhold Publishing Corp., New York, 1956. Examples of such curing agents are benzoyl peroxide, benzoyl peroxide compounded with tricresyl phosphate, benzoyl peroxide compounded with dibutyl phthalate or dimethyl phthalate, 2,4-dichlorobenzoyl peroxide compounded with dibutylphthalate, methylethyl ketone peroxide in dimethyl phthalate, bis-(para-bromobenzoyl) peroxide, bis-(phthalyl) peroxide, bis-(parachlorobenzoyl) peroxide, bis-(succinyl) peroxide, acetylbenzoyl peroxide, etc. The described phosphate and phthalates are diluents and are unessential to the reaction.

Unfortunately, it is difficult to obtain a satisfactory cure with polyesters catalyzed with materials of the type described. The major problems encountered are long cure times which are economically unattractive and necessitate the use of external heat to speed the cure, such reaction often resulting in a product evidencing inferior properties. In order to overcome these difficulties, it has been customary to employ an accelerator as a means of activating the catalyst.

In accordance with the present invention, rapid curing of epoxy resins and polyesters is effected without application of external heat in the presence of a conventional curing agent and an accelerator comprising water and silica gel. Further, a flexible process is provided for the manufacture of an epoxy foam which requires no preheating to initiate foaming.

In general, the process of the present invention is effected simply by adding the silica gel to a standard epoxy resin curing system or a polyester curing system and subsequently adding the required amounts of water. It is theorized that the silica gel absorbs the water present in the resinous material as well as that intentionally added and in so doing gives off heat exothermically, thereby accelerating the curing reaction. Furthermore, silica gel acts as a filler and permits uniform diffusion of the resultant heat through the resin, so reducing the likelihood of cracking.

The silica gel employed is a partially hydrated form of colloidal silica obtained by washing and drying the jelly-like substance formed by treating a silicate solution with an acid and contains not less than 99.6% silica ($SiO_2$) determined on a dry weight basis.

The granulation of the silica gel employed is not critical.

The residual moisture content of the silica gel is preferably below 5.5% and has a density within the range of 0.72–0.78 gram per milliliter calculated on the basis of the weight of the sample without correcting for its residual moisture content. Although the ranges set forth above are not critical, it is considered advantageous to operate therein for practical reasons.

In the operation of the process the epoxy resin or polyester is mixed with the silica gel, the latter being present in an amount within the range of 1–100 parts by weight per 100 parts by weight of nondilute epoxy resin and 2–125 parts by weight per 100 parts by weight of dilute polyester. The use of quantities greater than that indicated maximum create practical difficulties in that stirring and pouring of the mix is prevented whereas the use of less than the indicated minimum of silica gel fails to accelerate the cure.

It will be appreciated by those skilled in the art that resin systems utilizing diluents, flexibilizers or plasticizers which are less viscous in nature than the nondilute resin permit the addition of silica gel in amounts greater than the indicated maximum.

Following the addition of the silica gel, water is added to the mixture in an amount within the range of 0.1–10 parts by weight per 100 parts by weight of nondilute epoxy resin and in an amount within the range of 0.5–10 parts by weight per 100 parts by weight of dilute polyester. Variations below the indicated minimum once again fail to cause a significant acceleration of the cure, whereas increasing the noted maximum causes injury to the properties of the resins.

In the operation of the present inventive technique, it has been determined that epoxy foams are obtained in those instances wherein distilled water is added to the epoxy curing system in an amount of at least 5 parts by weight per 100 parts by weight of silica gel, so resulting in a foam which is of interest for insulating purposes and mechanical uses. The application of the described technique for the preparation of such foams is particularly advantageous in that the use of foaming agents is avoided.

The present inventive technique as described above may be effected at room temperature. For the purposes of this invention, room temperature is defined as including ordinary room or ambient temperatures typically within the range of 20–25° C., although temperatures higher and lower may be employed. It is intended to include any curing process not requiring the application of external heat. The cure may be accomplished by merely mixing the resin and silica gel prior to adding the water or, in the alternative, adding the water to the resin and then adding the silica gel and permitting the resultant mixture to stand at room temperature. The process may be carried out in unusually short periods of time, typically of the order of one-third to one-half the time required for curing in the absence of the silica gel and water. The primary advantage of such rapid cure lies in the diminution of the effect of elevated temperatures.

The following examples are given by way of illustration and are not to be construed as limitations of this invention, many variations of which are possible within the scope and spirit thereof.

The silica gel used in the examples described below conformed to the following limits:

| | Percent |
|---|---|
| Retained by 20 mesh sieve | 0 |
| Retained by 28 mesh sieve (maximum) | 6 |
| Retained by 65 mesh sieve (minimum) | 50 |
| Retained by 150 mesh sieve do | 85 |
| Retained by 200 mesh sieve do | 94 |
| Passed by 200 mesh sieve (maximum) | 6 |

*Example I*

This example illustrates the unexpected improvement in curing time obtained by treating a phenol epoxy resin in the presence of an aliphatic amine glycidyl adduct.

(a) A mixture of 100 parts of a glycidyl ether of bisphenol F (nondilute) having a viscosity within the range of 7000–19,000 centipoises at 27° C., an average molecular weight within the range of 350–400 and an epoxide equivalent weight within the range of 174–186, 20 parts of an aliphatic-glycidyl adduct having a viscosity within the range of 3500–5000 centistokes at 25° C. and 1 part of silica gel having greater than 99.6% silicon dioxide determined on a dry weight basis, an apparent density of 0.75 gram per milliliter and a residual moisture content of 5.0% was prepared. To the mixture there was added 0.1 part by weight of water. The mixture was thoroughly stirred to blend the ingredients and maintained at room temperature. In 9 minutes the mixture gelled and a celar hard resin was obtained.

(b) The above procedure was repeated with the exception that 10 parts by weight of water and 100 parts by weight of silica gel were employed. The mixture gelled in 3 minutes and a hard foamed resin was obtained. The original mixture expanded to twice its volume.

(c) The procedure of Example I(a) was repeated in the absence of the water and silica gel. The mixture gelled in 13 minutes, and a clear hard resin was obtained.

*Example II*

(a) A mixture of 100 parts by weight of a diglycidyl ether of bisphenol A having a viscosity within the range of 11,000 to 14,000 centipoises at 25° C., an average molecular weight within the range of 350 to 400 and an epoxide equivalent weight within the range of 185 to 200 and containing 11% by weight of butyl glycidyl ether, 20 parts by weight of the aliphatic glycidyl adduct employed in Example I, and one part by weight of the silica gel employed in Example I was prepared. To the mixture there was added 0.1 part by weight of water. The mixture was thoroughly stirred to blend the ingredients and maintained at room temperature. In 11 minutes the mixture gelled and a clear hard resin was obtained.

(b) The above procedure was repeated with the exception that 10 parts by weight of distilled water and 125 parts by weight of silica were employed. The mixture gelled in 2 minutes and a hard foamed resin was obtained. The original mixture expanded to twice its volume.

(c) The procedure of Example II(a) was repeated in the absence of water and silica gel. The mixture gelled in 15 minutes and a clear hard resin was obtained.

*Example III*

(a) A mixture of 50 parts by weight of the glycidyl ether of bisphenol F employed in Example I, 50 parts by weight of a liquid polysulfide polymer having a molecular weight of 1000, 2% crosslinking agent (trichloropropane) and a viscosity within the range of 700–1200 centipoises at 27° C., 5 parts by weight tridimethyl amino methyl phenol and one part by weight of the silica employed in Example 1 was prepared. To the mixture there was added 0.1 part by weight of distilled water. The mixture was thoroughly stirred to blend the ingredients and maintained at room temperature. In 20 minutes the mixture gelled and a clear hard resin was obtained.

(b) The procedure of Example III(a) was repeated with the exception that 10 parts by weight of water and 100 parts by weight of silica were employed. The mixture gelled in 12 minutes and a hard resin was obtained.

(c) The procedure of Example III(a) was repeated in the absence of the water and the silica gel. The mixture gelled in 25 minutes.

Example IV (a) A mixture of 50 parts by weight of the glycidyl ether of bisphenol F employed in Example I, 50 parts by weight of a polyamide formed by the reaction of linoleic acid dimer with ethylene diamine and having an amine value of 290–300 and a viscosity within the range of 40,000–60,000 centipoises at 25° C., 5 parts by weight of triethylenetetramine and one part by weight of the silica employed in Example I was prepared. To the mixture there was added 0.1 part by weight of distilled water. The mixture was thoroughly stirred to blend the ingredients and maintained at room temperature. In 28 minutes the mixture gelled and a clear hard resin was obtained.

(b) The procedure of Example IV(a) was repeated with the exception that 10 parts by weight of water and 100 parts by weight of silica were employed. The mixture gelled in 9 minutes and a hard resin was obtained.

(c) The procedure of Example IV(a) was repeated in the absence of water and silica. The mixture gelled in 37 minutes.

Example V

This example illustrates the unexpected improvement in curing time obtained by treating a styrene polyester with water and silica.

(a) A mixture of 100 parts of a base polyester formed by reacting phthalic and maleic anhydrides with propylene glycol and containing styrene monomer as a crosslinking agent, having a viscosity at 77° F. of 525 centipoises and a specific gravity within the range of 1.10–1.40, 0.5 part by weight of methyl ethyl ketone peroxide, 0.5 part by weight of cobalt octoate and 2 parts by weight of the silica gel employed in Example I was prepared. To that mixture there was added 0.5 part by weight of distilled water. The mixture was stirred to blend the ingredients and maintained at room temperature. In 5 minutes the mixture gelled and a clear hard resin was obtained.

(b) The procedure of Example V(a) was repeated with the exception that 10 parts by weight of distilled water and 125 parts by weight of silica were employed. The mixture gelled in 3 minutes and a hard resin was obtained.

(c) The procedure of Example V(a) was repeated in the absence of water and silica gel. The mixture gelled in 7 minutes.

While the invention has been described in detail in the foregoing description, the aforesaid is by way of illustration only and is not restrictive in character. The several modifications which will readily suggest themselves to persons skilled in the art, such as the substitution of sodium hydrate asbestos absorbent for silica gel, are all considered within the broad scope of the invention, reference being had to the appended claims.

What is claimed is:

1. A method for curing a resin selected from the group consisting of epoxy resins containing at least two terminal 1,2 epoxy groups per molecule of epoxy resin and polyester resins formed by the condensation of a dicarboxylic acid and a dihydric alcohol which comprises the steps of successively (a) admixing the said resin with a curing agent and an accelerator consisting essentially of silica gel, having a maximum residual moisture content of 5.5 percent based on the weight of the silica gel, and (b) adding water to the resultant mixture in an amount within the range of 0.1 to 10 parts by weight per 100 parts by weight of non-dilute epoxy resin and within the range of 0.5 to 10 parts by weight per 100 parts by weight of dilute polyester resin, whereby the said silica gel absorbs the said water, so resulting in the evolution of heat, thereby accelerating the curing reaction.

2. A method in accordance with the procedure of claim 1 wherein said silica gel is present in an amount within the range of 1 to 100 parts by weight per 100 parts by weight of nondilute epoxy resin and within the range of 2 to 125 parts by weight per 100 parts by weight of dilute polyester resin.

3. A foamed epoxy resin obtained in accordance with the procedure of claim 2 wherein said water is present in an amount of at least 5 parts by weight per 100 parts by weight of silica gel.

4. A method in accordance with the procedure of claim 1 wherein said resin is a glycidyl ether of [2,2,bis-(4-hydroxy-phenyl)-methane] having a viscosity within the range of 7000–19,000 centipoises at 27° C., an average molecular weight within the range of 350–400 and an epoxide equivalent within the range of 174–186.

5. An epoxy foam produced in accordance with the procedure of claim 4 wherein said water is present in an amount of 10 parts by weight per 100 parts by weight of silica gel.

6. A method in accordance with the procedure of claim 1 wherein said resin is a diglycidyl ether of [2,2,bis-(4-hydroxy-phenyl)-propane] having a viscosity within the range of 7000–19,000 centipoises at 27° C., an average molecular weight within the range of 350–400 and an epoxide equivalent within the range of 185–195.

7. An epoxy foam produced in accordance with the procedure of claim 6 wherein said water is present in an amount of 10 parts by weight per 100 parts by weight of silica gel.

8. A method in accordance with the procedure of claim 1 wherein said resin is a butyl glycidyl ether of [2,2,bis-(4-hydroxy-phenyl)-propane] having a viscosity within the range of 7,000–19,000 centipoises at 27° C., an average molecular weight within the range of 350–400 and an epoxide equivalent within the range of 185–195.

9. A method in accordance with the procedure of claim 1 wherein said resin is a base polyester formed by reacting phthalic and maleic anhydrides with propylene glycol, the said resin containing styrene as a crosslinking agent, and having a viscosity at 77° F. of 525 centipoises and a specific gravity within the range of 1.10:1.40.

References Cited by the Examiner

UNITED STATES PATENTS

| | | | |
|---|---|---|---|
| 2,514,141 | 7/1950 | Phillips | 260—2.5 |
| 2,610,959 | 9/1952 | Nordlander | 260—40 |
| 2,739,134 | 3/1956 | Parry et al. | 260—2.5 |
| 3,050,493 | 8/1962 | Wagner et al. | 260—37 |
| 3,072,500 | 1/1963 | Berlinghof | 260—37 |

FOREIGN PATENTS 783,956   10/1957   Great Britain.

OTHER REFERENCES

Loftman: Cabot Corporation (Minerals and Chemicals Division), "Theoretical and Practical Aspects of the Rheological Properties of Pyrogenic Silica in Aqueous and Non-Aqueous Media," pages 1–12.

MURRAY TILLMAN, *Primary Examiner.*

JAMES A. SEIDLECK, *Examiner.*